US009535793B2

(12) United States Patent
Zhou et al.

(10) Patent No.: US 9,535,793 B2
(45) Date of Patent: Jan. 3, 2017

(54) METHOD AND SYSTEM FOR DATA MIGRATION (71) Applicant: TENCENT TECHNOLOGY (SHENZHEN) COMPANY LIMITED, Shenzhen, Guangdong (CN)

(72) Inventors: Zhihao Zhou, Guangdong (CN); Ming Tian, Guangdong (CN); Li Liu, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 246 days.

(21) Appl. No.: 14/296,877

(22) Filed: Jun. 5, 2014

(65) Prior Publication Data
US 2014/0289557 A1  Sep. 25, 2014

Related U.S. Application Data (63) Continuation of application No. PCT/CN2013/089953, filed on Dec. 19, 2013.

(30) Foreign Application Priority Data

Jan. 5, 2013 (CN) .......................... 2013 1 0002047

(51) Int. Cl.
*G06F 11/00* (2006.01)
*G06F 11/14* (2006.01)
*G06F 17/30* (2006.01)
*G06F 11/20* (2006.01)

(52) U.S. Cl.
CPC ......... *G06F 11/1435* (2013.01); *G06F 17/303* (2013.01); *G06F 11/2064* (2013.01); *G06F 11/2082* (2013.01); *G06F 11/2089* (2013.01)

(58) Field of Classification Search
CPC .............. G06F 11/2082; G06F 11/2064; G06F 11/2089
See application file for complete search history.

(56) References Cited

U.S. PATENT DOCUMENTS

| 5,875,457 | A | * | 2/1999 | Shalit | .................... G06F 3/0619 711/111 |
| 7,822,933 | B1 | * | 10/2010 | Sontakke | .............. G06F 3/0617 707/648 |
| 8,010,764 | B2 | * | 8/2011 | Keller, Jr. | ............. G06F 1/3225 711/157 |
| 2008/0104443 | A1 | * | 5/2008 | Akutsu | ............... G06F 11/2058 714/6.12 |

* cited by examiner

*Primary Examiner* — Charles Ehne
(74) *Attorney, Agent, or Firm* — Frommer Lawrence & Haug LLP; William S. Frommer (57) ABSTRACT A method and a system for data migration are described, the method for data migration including: slicing data in an original system to obtain a data slice; importing the data slice into a new system; and redoing, in the new system, respective data corresponding to at least one pre-recorded write request according to a sequence number order of the at least one pre-recorded write request, wherein the at least one pre-recorded write request above is to simultaneously write to both the original system and the new system. In the method and the system, data in an original system can be seamlessly imported to a new system without forbidding writes to the original system, and the data in the new system can be recovered to the latest by a redo technique. Without any awareness of users, the data migration can be achieved in the background.

20 Claims, 4 Drawing Sheets

FIG. 6

METHOD AND SYSTEM FOR DATA MIGRATION

CROSS-REFERENCE TO RELATED APPLICATIONS

This is a U.S. continuation application under 35 U.S.C. §111(a) claiming priority under 35 U.S.C. §§120 and 365(c) to International Application No. PCT/CN2013/089953 filed on Dec. 19, 2013, which claims the priority benefit of Chinese Patent Application No. 201310002047.7 filed on Jan. 5, 2013, the contents of which are incorporated by reference herein in their entirety for all intended purposes.

FIELD OF THE TECHNICAL

The disclosure relates to computer technology field, and particularly to a method and a system for data migration.

BACKGROUND

During a process that a system of a User Generated Content (User Generated Content, UGC) service (such as a microblogging) changes from an original system to a new one, data migration issues are unavoidably to be encountered. How to migrate data completely from the original system to the new system without users' awareness as far as possible is always a problem pressing for solutions.

In a conventional data migration process, data in the original system is imported to a new system after writes to the original system are disabled, and then write requests of users are routed to the new system to continue the service. However, such a data migration process is most violent, in which writes to the original system must be disabled, and how long the writes are disabled depends on the time consumed by the data migration. The more time the data migration needs, the longer the writes must be disabled, thereby affecting write requests of users.

SUMMARY

In a method and a system for data migration according to various embodiment of the invention, data in an original system can be seamlessly imported to a new system without forbidding writes to the original system.

According to a first aspect of the present invention, it is provided a method for data migration, comprising:
slicing data in an original system to obtain a data slice;
importing the data slice into a new system; and
redoing, in the new system, respective data corresponding to at least one pre-recorded write request according to a sequence number order of the at least one pre-recorded write request, wherein the at least one pre-recorded write request is to simultaneously write to both the original system and the new system.

According to a second aspect of the present invention, it is provided a system for data migration, comprising:
a slicing unit configured to slice data in an original system to obtain a data slice;
an importing unit configured to import the data slice into a new system; and
a redoing unit configured to redo, in the new system, respective data corresponding to at least one pre-recorded write request according to a sequence number order of the at least one pre-recorded write request, wherein the at least one pre-recorded write request is to simultaneously write to both the original system and the new system.

In various embodiments of the present invention, after slicing the data in an original system to obtain a data slice and importing the data slice into a completed new system, data may be redone in the new system according to a sequence number order of at least one pre-recorded write request, wherein the data corresponds to the pre-recorded write request, and the write request is to simultaneously write to both the original system and the new system. In this manner, data in the original system can be seamlessly imported into the new system without forbidding writes to the original system, and the data in the new system can be recovered to the latest by a redo technique. Without any awareness of users, the data migration can be achieved in the background. In addition, the risk of importing data from the original system to the new one can be reduced, and the operations and maintenances can be simplified.

BRIEF DESCRIPTION OF THE DRAWINGS

The accompanying drawings are presented to assist in the description of exemplary embodiments of the invention and are provided solely for illustration of the embodiments and not limitation thereof.

DETAILED DESCRIPTION OF ILLUSTRATED EMBODIMENTS

One or more exemplary embodiments of the invention are hereinafter described further in detail with reference to the accompanying drawings. The term "exemplary" used throughout this description means "serving as an example, instance, or illustration," and should not necessarily be construed as preferred or advantageous over other exemplary embodiments. It would be apparent that a person having ordinary skills in the art may obtain other embodiments based on the illustrated exemplary embodiments of the invention without paying any creative work, and these embodiments should also be within the protection scope sought by the present invention.

Figure 5:
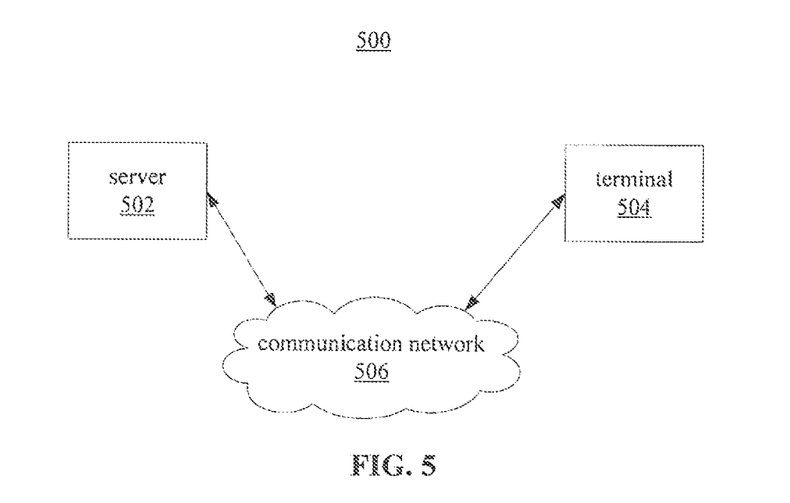
FIG. 5 depicts an exemplary environment incorporating certain disclosed embodiments.

FIG. 5 depicts an exemplary environment 500 incorporating exemplary methods and systems for data migration in accordance with various disclosed embodiments. As shown in FIG. 5, the environment 500 can include a server 502, a terminal 504, and a communication network 506. The server 502 and the terminal 504 may be coupled through the communication network 506 for information exchange including, e.g., sending/receiving write requests, response information, etc. Although only one terminal 504 and one server 502 are shown in the environment 500, any number of terminals 504 or servers 502 may be included, and other devices may also be included. Particularly, the server 502 may include a plurality of servers, and one or more of them are used to construct the system for data migration and implement the method for data migration as disclosed in various embodiments below.

The communication network 506 may include any appropriate type of communication network for providing network connections to the server 502 and terminal 504 or among multiple servers 502 or terminals 504. For example, the communication network 506 may include the Internet or other types of computer networks or telecommunication networks, either wired or wireless.

A terminal, as used herein, may refer to any appropriate user terminal with certain computing capabilities, e.g., a personal computer (PC), a work station computer, a hand-held computing device (e.g., a tablet), a mobile terminal (e.g., a mobile phone or a smart phone), or any other client-side computing device.

A server, as used herein, may refer to one or more server computers configured to provide certain server functionalities, e.g., providing UGC (User Generated Content) services, receiving write requests, publishing data, etc. A server may also include one or more processors to execute computer programs in parallel.

Figure 6:
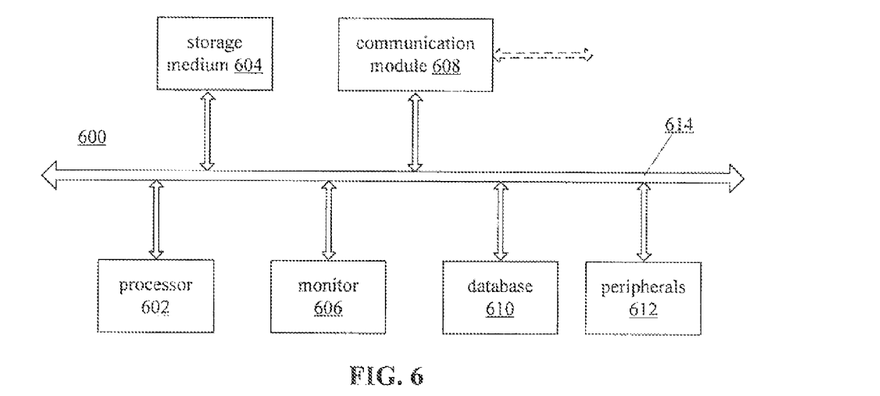
FIG. 6 depicts an exemplary computing system consistent with the disclosed embodiments.

The system and the method for data migration as disclosed in various embodiments below may be implemented on any appropriate computing platform. FIG. 6 shows a block diagram of an exemplary computing system 600 (or computer system 600) capable of implementing the system and the method for data migration. The computing system 600 may ran in the server 502 that is shown in FIG. 5. As shown in FIG. 6, the exemplary computer system 600 may include a processor 602, a storage medium 604, a monitor 606, a communication module 608, a database 610, peripherals 612, and one or more bus 614 to couple the devices together. Certain devices may be omitted and other devices may be included.

The processor 602 can include any appropriate processor or processors. Further, the processor 602 can include multiple cores for multi-thread or parallel processing. The storage medium 604 may include memory modules, e.g., Read-Only Memory (ROM), Random Access Memory (RAM), and flash memory modules, and mass storages, e.g., CD-ROM, U-disk, removable hard disk, etc. The storage medium 604 may store computer programs for implementing various processes (e.g., slicing data, importing data, redoing data, etc.), when executed by the processor 602.

The monitor 606 may include display devices for displaying contents in the computing system 600, e.g., displaying write request information, redo information, etc. The peripherals 612 may include I/O devices such as keyboard and mouse.

Further, the communication module 608 may include network devices for establishing connections through the communication network 506. The database 610 may include one or more databases for storing certain data and for performing certain operations on the stored data, e.g., storing data to be migrated, storing write requests, searching and management operations.

Various embodiments provide methods and systems for data migration. The methods and systems are illustrated in various examples described herein.

In a method and a system for data migration according to various embodiment of the invention, data in an original system can be seamlessly imported to a new system without forbidding writes to the original system, which will be described in detail below.

Figure 1:
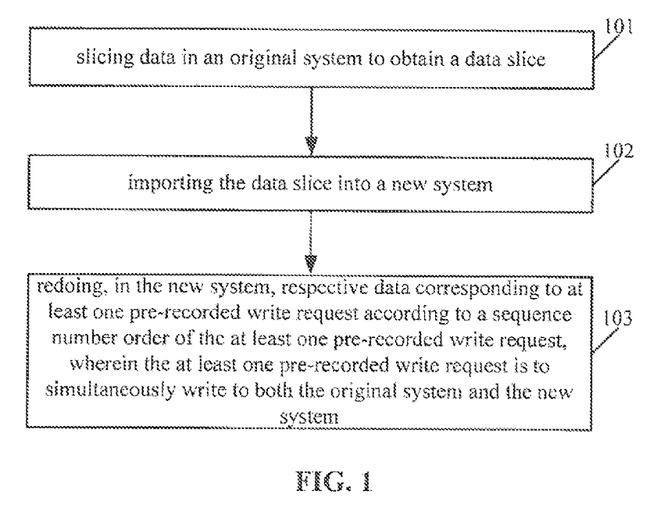
FIG. 1 is a flowchart of a method for data migration provided by one embodiment of the present invention.

Referring to FIG. 1, it is a flowchart of a method for data migration provided by one embodiment of the present invention. The method for data migration described in FIG. 1 is applicable not only to a data migration between new and original systems of UGC services (such as a microblogging) but also to a data migration between new and original systems of other types of services, which will not be restricted in embodiments of the invention. As shown in FIG. 1, the method for data migration comprises the following steps.

Step 101 is: slicing data in an original system to obtain a data slice.

In an embodiment of the present invention, a data slice is abbreviated as a slice, which refers to a complete mirrored replication of data in the original system at a certain point in time to import and/or recover data in a new system.

Step 102 is: importing the data slice into a new system.

The data slices can be bulk imported into the new system by a data migration process in one embodiment of the present invention.

Wherein the data migration process refers to a program that imports data in an original system into a now system by loading the data slices of the original system.

Step 103 is: redoing, in the new system, respective data corresponding to at least one pre-recorded write request according to a sequence number order of the at least one pre-recorded write request, wherein the at least one pre-recorded write request is to simultaneously write to both the original system and the new system.

In one embodiment of the present invention, the sequence number of the write request is a sequence number assigned to each write request, the sequence number is used for redoing the data in the new system according to the sequence order.

The pre-recorded write request refers to a write request recorded during the data migration process migrating data from the original system to the new systems in one embodiment of the present invention. Specifically, data corresponds to each pre-recorded write request can be redone sequentially according to a sequence number order of the pre-recorded write requests. Wherein recording the write requests during the data migration process migrating data from the original system to the new system may effectively reduce the amount of data to be subsequently redone. Of course, without taking into account the reduction of the amount of data to be subsequently redone, the write requests can be recorded before the data migration process migrating data from the original system to the new system, which will not be restricted in embodiments of the present invention.

In one embodiment of the present invention, the step 103 of redoing data in the new system according to the sequence number order of the at least one pre-recorded write request lay comprise the following steps: 1) analyzing each pre-recorded write request sequentially and obtaining an encryption key included in the pre-recorded write request according to the sequence number order of the pre-recorded write requests; 2) determining, in the new system, data matching and selecting the encryption key included in the write request; and 3) redoing the data matching and selecting the encryption key included in the write request of the new system according to the write request.

In one embodiment of the present invention, redo is a pipeline for redoing write requests in the new system, which is able to recover the data in the new system to the latest.

In the method for data migration described in FIG. 1, data in an original system can be seamlessly imported into a new system without disabling writes to the original system, and the data in the new system can be recovered to the latest by a redo technique. Without any awareness of users, the data migration can be achieved in the background. In addition, the risk of importing data from the original system to the new one can be reduced, and the operations and maintenances can be simplified.

Figure 2:
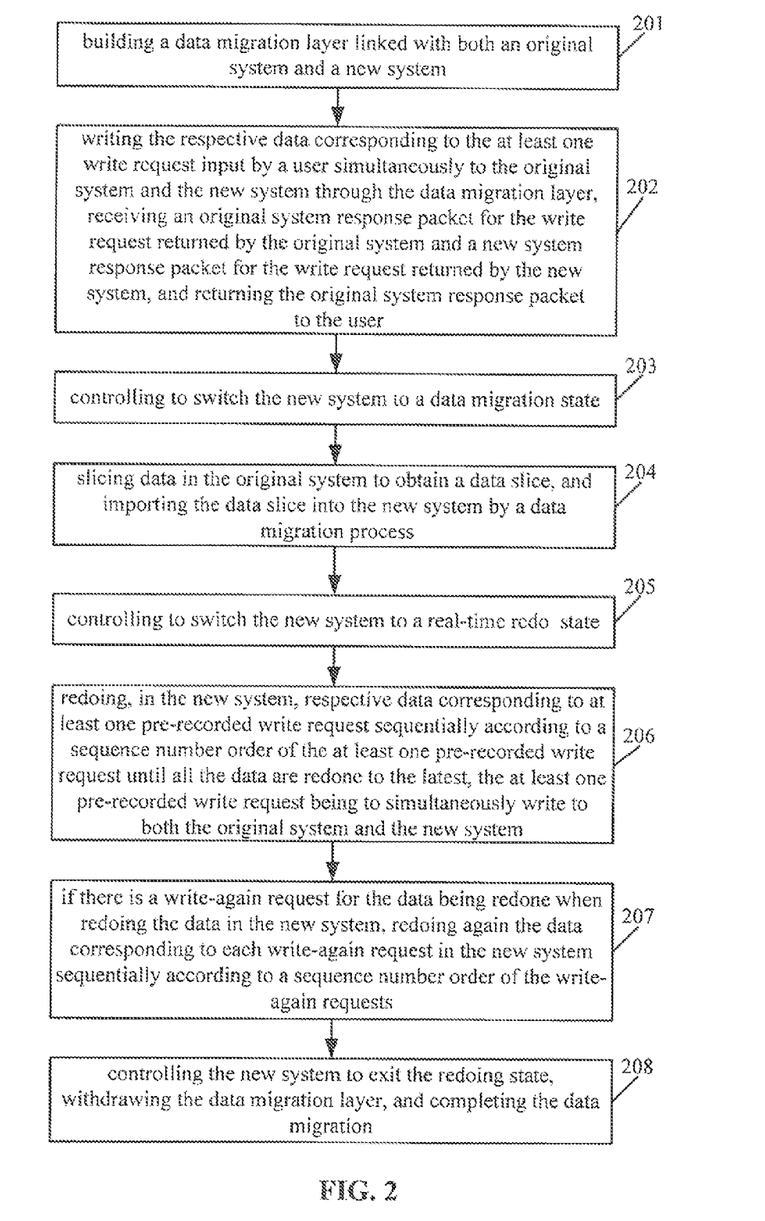
FIG. 2 is a flowchart of a method for data migration provided by another embodiment of the present invention.

Referring to FIG. 2, it is a flowchart of a method for data migration provided by another embodiment of the present invention. Similarly, the method for data migration described in FIG. 2 is applicable not only to a data migration between new and original systems of data migration UGC services (such as a microblogging) but also to data migration between the new and original systems of other types of services, which will not be restricted in embodiments of the invention. As shown in FIG. 2, the method for data migration comprises the following steps.

Step 201 is: building a data migration layer linked with both an original system and a new system.

In an embodiment of the present invention, a data migration layer, also called "double write layer", is used for writing write requests input by users simultaneously into new and original systems according to a certain sequence, thereby performing a data migration between the new and original systems.

Step 202 is: writing respective data corresponding to at least one pre-recorded write request input by a user simultaneously to the original system and the new system through the data migration layer, receiving an original system response packet for the pre-recorded write request returned by the original system and a new system response packet for the pre-recorded write request returned by the new system, and returning the original system response packet to the user.

Step 203 is controlling to switch the new system to a data migration state.

Wherein, the data migration state is a special operating and maintaining state in which all modification requests of users are recorded and the write pipeline may be redone not according to the sequence order.

Step 204 is: slicing data in the original system to obtain a data slice, and importing the data slice into the new system by a data migration process (cover directly).

Step 205 is: controlling to switch the new system to a real-time redo state.

Step 206 is: redoing, in the new system, respective data corresponding to at least one pre-recorded write request sequentially according to a sequence number order of the at least one pre-recorded write request until all the data are redone to the latest, the at least one pre-recorded write request being to simultaneously write to both the original system and the new system.

Step 207 is: if there is a write-again request for the data being redone when redoing the data in the new system, redoing again the data corresponding to each write-again request in the new system sequentially according to a sequence number order of the write-again requests.

In one embodiment of the present invention, if there is a write-again request for the data being redone during the process of redoing data in the new system, an error of the final data may be caused. A simple method to deal with this situation is to redo again the data corresponding to each write-again request in the new system sequentially according to an sequence number order of the write-again requests (generally, the amount of data to be redone again is very little). However, in the practice, situations that such a write-again request happens and causes a data inconsistency are less than 0.01%. That is, a relatively good data consistency can still be achieved without redoing the data to be redone again.

Step 208 is: controlling the new system to exit the redo state, withdrawing the data migration layer, and completing the data migration.

In the method for data migration described in FIG. 2, in order to ensure that a data migration process for importing data slices of an original system do not conflict with a write process for receiving external write requests, it may be necessary that data imported from the original system are not modified by the write process of the new system which is in a data migration state, but at the same time, the sequence numbers of external write requests need to be recorded, thereby the data imported during the data migration process can be supplemented in the subsequent redo of data.

In the method for data migration described in FIG. 2, data in an original system can be seamlessly imported into a new system without disabling writes to the original system, and the data in the new system can be recovered to the latest by a redo technique. Without any awareness of users, the data migration can be achieved in the background. In addition, the risk of importing data from the original system to the new one can be reduced, and the operations and maintenances can be simplified.

Figure 3:
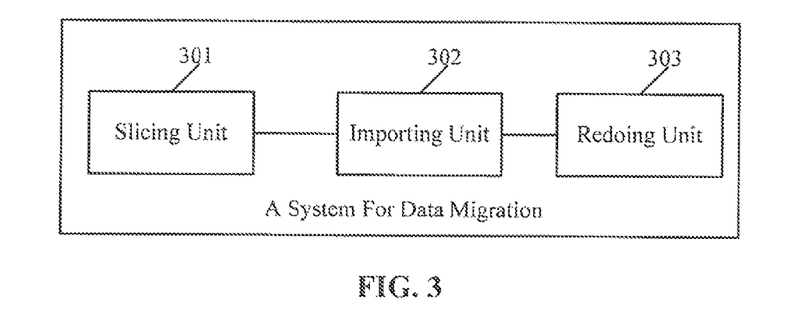
FIG. 3 is a structure diagram of a system for data migration provided by one embodiment of the present invention.

Referring to FIG. 3, it is a structure diagram of a system for data migration provided by one embodiment of the present invention. The system for data migration described in FIG. 3 is applicable not only to a data migration between original and new systems of data migration UGC services (such as a microblogging) but also to data migration between the original and new systems of other types of services, which will not be restricted in embodiments of the invention. As shown in FIG. 3, the system for data migration may comprise: a slicing unit 301 configured to slice data in an original system to obtain a data slice; an importing unit 302 configured to import the data slice into a new system; and a redoing unit 303 configured to redo, in the new system, respective data corresponding to at least one pre-recorded write request sequentially according to a sequence number order of the at least one pre-recorded write request, wherein the at least one pre-recorded write request is to simultaneously write to both the original system and the new system.

In one embodiment of the present invention, the importing unit 302 is specifically configured to import the data slice into the new system by a data migration process.

The redoing unit 303 is specifically configured to analyze the at least one pre-recorded write request sequentially and obtain an encryption key included in the pre-recorded write request according to the sequence number order of the at least one pre-recorded write request, determine, in the new system, data matching and selecting the encryption key; and redo the data matching and selecting the encryption key in the new system according to the write request in the embodiment of the present invention.

Figure 4:
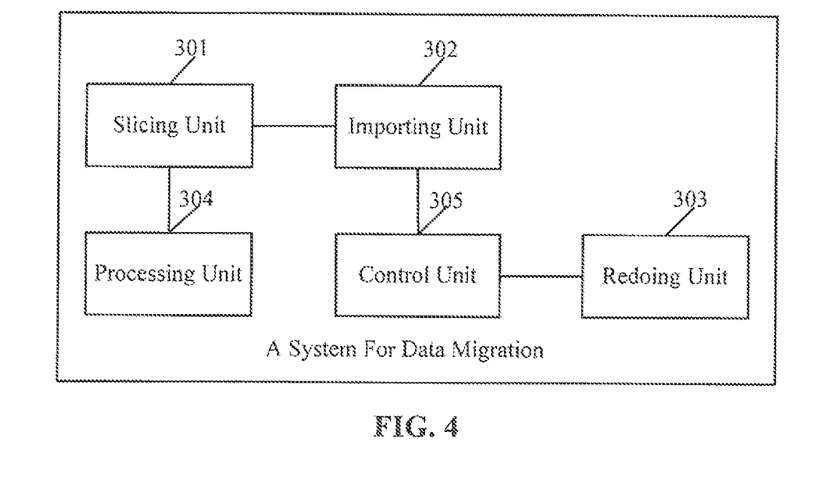
FIG. 4 is a structure diagram of a system for data migration provided by another embodiment of the present invention.

Referring to FIG. 4 together, it is a structure diagram of a system for data migration provided by another embodiment of the present invention. The system for data migration described in FIG. 4 can be obtained by optimizing the system for data migration shown in FIG. 3. Compared with the system for data migration in FIG. 3, the system for data migration shown in FIG. 4 may further comprise: a processing unit 304 configured to build a data migration layer linked with both an original system and a new system, write the data corresponding to the pre-recorded write request input by a user simultaneously to the original system and the new system through the data migration layer, receive an original system response packet for the pre-recorded write request returned by the original system and a new system response packet for the pre-recorded write request returned by the new system, and return the original system response packet to the user before the slicing unit 301 slicing the data in the original system to obtain the data slice; and a control unit 305 configured to control to switch the new system to a real-time redo state after the importing unit 302 importing the data slice into the new system, and before the redoing unit 303 redoing, in the new system, respective data corresponding to at least one pre-recorded write request according to the sequence number order of the at least one pre-recorded write request.

In one embodiment of the present invention, the redoing unit 303 is further configured to redo again the data corresponding to a modifying-again request in the new system according to a sequence number order of the modifying-again request if there is the modifying-again request to modify the data being redone when redoing the data in the new system.

In the data migration method described as FIG. 3 and FIG. 4, data in an original system can be seamlessly imported into a new system without disabling writes to the original system, and the data in the new system can be recovered to the latest by a redo technique. Without any awareness of users, data migration can be achieved in the background. In addition, the risk of importing data from the original system to the new one can be reduced, and the operations and maintenances can be simplified Based on the analysis above, it is apparent that the method and the system for data migration further possess the following advantages:

1. the background process of data migration can be performed without any awareness of users (unnecessary to disable writes for users in the whole process, without affecting services of the original system);

2. the degree of perception of background data migration is greatly reduced for users, and when an exception occurs, the data migration can be stopped and performed again at any time;

3. the cost of operation and maintenance can be reduced, and the data migration can be performed at any time instead of having to be performed in the midnight;

4. the costs of bandwidth and verification post-migration can be reduced; in the data migration process, by copying the data slices only once, data recovery and alignment completely do not depend on the data in the original system.

In the embodiment of the present invention, the new system not essential to achieve a real-time redo state, the real-time redo state can be achieved in a manner that pulling data of an added part from the original system and merging the data into the new system. However, pulling data of the added part from the original system will put pressure on the online service system. In addition, the process of merging data is long and achieved so complexly.

A person having ordinary skills in the art will understand that all or part of the steps in methods according to the above embodiments can be achieved by a program instructing relevant hardware. The program may be stored in a computer readable storage medium, wherein the storage medium may comprises a flash disk, an optical disk, a read only memory (Read-Only Memory, ROM), a random access memory (Random Access Memory, RAM), a magnetic disk, an optical disk, or the like.

The foregoing descriptions are merely exemplary embodiments of the present invention, and not intended to limit the protection scope of the present invention. Any variation or replacement made by persons of ordinary skills in the art without departing from the spirit of the present invention shall fall within the protection scope sought by the appended claims.

What is claimed is:

1. A method for data migration, comprising:
    slicing data in an original system to obtain a data slice;
    importing the data slice into a new system; and
    redoing data in the new system corresponding to at least one pre-recorded write request according to a sequence number order of the at least one pre-recorded write request, wherein the at least one pre-recorded write request is to simultaneously write to both the original system and the new system.

2. The method for data migration according to claim 1, wherein said importing comprises:
    importing the data slice into the new system by a data migration process.

3. The method for data migration according to claim 2, before slicing the data in the original system to obtain the data slice, the method further comprising:
    building a data migration layer linked with both the original system and the new system;
    writing the respective data corresponding to the at least one pre-recorded write request input by a user simultaneously to the original system and the new system through the data migration layer;
    receiving an original system response packet for the pre-recorded write request returned by the original system and a new system response packet for the pre-recorded write request returned by the new system; and
    returning the original system response packet to the user.

4. The method for data migration according to claim 3, after importing the data slice into the new system, and before redoing, in the new system, the respective data corresponding to the at least one pre-recorded write request according to the sequence number order of the at least one pre-recorded write request, the method further comprising:
    switching the new system to a real-time redo state.

5. The method for data migration according to claim 4, after redoing the data in the new system according to the sequence number order of the at least one pre-recorded write request, the method further comprising:
    if there is a modifying-again request to modify the data being redone when redoing the data in the new system, redoing again the data corresponding to the modifying-again request in the new system according to a sequence number order of the modifying-again request.

6. The method for data migration according to claim 1, wherein said redoing comprises:
    analyzing the at least one pre-recorded write request and obtaining an encryption key included in the pre-recorded write request according to the sequence number order of the at least one pre-recorded write request, wherein the at least one pre-recorded write request is to simultaneously write to both the original system and the new system;
    determining, in the new system, data matching the encryption key; and
    redoing the data matching the encryption key in the new system according to the at least one pre-recorded write request.

7. The method for data migration according to claim 6, before slicing the data in the original system to obtain the data slice, the method further comprising:
    building a data migration layer linked with both the original system and the new system;

writing the respective data corresponding to the at least one pre-recorded write request input by a user simultaneously to the original system and the new system through the data migration layer;

receiving an original system response packet for the pre-recorded write request returned by the original system and a new system response packet for the pre-recorded write request returned by the new system; and returning the original system response packet to the user.

8. The method for data migration according to claim 7, after importing the data slice into the new system, and before redoing, in the new system, the respective data corresponding to the at least one pre-recorded write request according to the sequence number order of the at least one pre-recorded write request, the method further comprising:

switching the new system to a real-time redo state.

9. The method for data migration according to claim 8, after redoing the data in the new system according to the sequence number order of the at least one pre-recorded write request, the method further comprising:

if there is a modifying-again request to modify the data being redone when redoing the data in the new system, redoing again the data corresponding to the modifying-again request in the new system according to a sequence number order of the modifying-again request.

10. The method for data migration according to claim 1, before slicing the data in the original system to obtain the data slice, the method further comprising:

building a data migration layer linked with both the original system and the new system;

writing the respective data corresponding to the at least one pre-recorded write request input by a user simultaneously to the original system and the new system through the data migration layer;

receiving an original system response packet for the pre-recorded write request returned by the original system and a new system response packet for the pre-recorded write request returned by the new system; and returning the original system response packet to the user.

11. The method for data migration according to claim 10, after importing the data slice into the new system, and before redoing, in the new system, the respective data corresponding to the at least one pre-recorded write request according to the sequence number order of the at least one pre-recorded write request, the method further comprising:

switching the new system to a real-time redo state.

12. The method for data migration according to claim 11, after redoing the data in the new system according to the sequence number order of the at least one pre-recorded write request, the method further comprising:

if there is a modifying-again request to modify the data being redone when redoing the data in the new system, redoing again the data corresponding to the modifying-again request in the new system according to a sequence number order of the modifying-again request.

13. A system for data migration, comprising:

a slicing unit configured to slice data in an original system to obtain a data slice;

an importing unit configured to import the data slice into a new system; and a redoing unit configured to redo data in the new system data corresponding to at least one pre-recorded write request according to a sequence number order of the at least one pre-recorded write request, wherein the at least one pre-recorded write request is to simultaneously write to both the original system and the new system.

14. The system for data migration according to claim 13, the importing unit is specifically configured to import the data slice into the new system by a data migration process.

15. The system for data migration according to claim 14 further comprising:

a processing unit configured to build a data migration layer linked with both the original system and the new system before the slicing unit slicing the data in the original system to obtain the data slice, write the respective data corresponding to the at least one pre-recorded write request input by a user simultaneously to the original system and the new system through the data migration layer, receive an original system response packet for the pre-recorded write request returned by the original system and a new system response packet for the pre-recorded write request returned by the new system, and return the original system response packet to the user.

16. The system for data migration according to claim 13, the redoing unit is specifically configured to analyze the at least one pre-recorded write request and obtain an encryption key included in the pre-recorded write request according to the sequence number order of the at least one pre-recorded write request, the at least one pre-recorded write request being to simultaneously write to both the original system and the new system; determine, in the new system, data matching the encryption key; and redo the data matching the encryption key in the new system according to the at least one pre-recorded write request.

17. The system for data migration according to claim 13 further comprising:

a processing unit configured to build a data migration layer linked with both the original system and the new system before the slicing unit slicing the data in the original system to obtain the data slice, write the respective data corresponding to the at least one pre-recorded write request input by a user simultaneously to the original system and the new system through the data migration layer, receive an original system response packet for the pre-recorded write request returned by the original system and a new system response packet for the pre-recorded write request returned by the new system, and return the original system response packet to the user.

18. The system for data migration according to claim 17, further comprising:

a control unit configured to switch the new system to a real-time redo state after the importing unit importing the data slice into the new system, and before the redoing unit redoing, in the new system, the respective data corresponding to the at least one pre-recorded write request according to the sequence number order of the at least one pre-recorded write request.

19. The system for data migration according to claim 18, the redoing unit is further configured to redo again the data corresponding to a modifying-again request in the new system according to a sequence number order of the modifying-again request if there is the modifying-again request to modify the data being redone when redoing the data in the new system.

20. A non-transitory computer readable storage medium storing instructions that, when executed by a processor, cause the processor to implement a method comprising steps of:

slicing data in an original system to obtain a data slice;
importing the data slice into a new system; and
redoing data in the new system data corresponding to at least one pre-recorded write request according to a sequence number order of the at least one pre-recorded write request, wherein the at least one pre-recorded write request is to simultaneously write to both the original system and the new system.

\* \* \* \* \*